United States Patent
Khartikov et al.

(10) Patent No.: US 9,256,497 B2
(45) Date of Patent: Feb. 9, 2016

(54) CHECKPOINTS ASSOCIATED WITH AN OUT OF ORDER ARCHITECTURE

(71) Applicants: Denis M. Khartikov, San Jose, CA (US); John H. Kelm, Sunnyvale, CA (US); Naveen Neelakantam, Mountain View, CA (US)

(72) Inventors: Denis M. Khartikov, San Jose, CA (US); John H. Kelm, Sunnyvale, CA (US); Naveen Neelakantam, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 54 days.

(21) Appl. No.: 14/224,233

(22) Filed: Mar. 25, 2014

(65) Prior Publication Data

US 2015/0278025 A1  Oct. 1, 2015

(51) Int. Cl.
*G06F 11/00* (2006.01)
*G06F 11/14* (2006.01)
*G06F 9/30* (2006.01)

(52) U.S. Cl.
CPC ........ *G06F 11/1435* (2013.01); *G06F 9/30145* (2013.01)

(58) Field of Classification Search
CPC ............ G06F 11/1471; G06F 11/1407; G06F 11/1438; G06F 11/1435; G06F 11/1482; G06F 11/1497; G06F 11/08; G06F 9/3842; G06F 9/4881; G06F 9/3855; G06F 9/384; G06F 9/3859
See application file for complete search history.

(56) References Cited

U.S. PATENT DOCUMENTS

| | | | | | |
|---|---|---|---|---|---|
| 5,564,111 | A | * | 10/1996 | Glew | G06F 9/3842 711/202 |
| 5,778,210 | A | * | 7/1998 | Henstrom | G06F 9/3836 712/215 |
| 6,941,489 | B2 | * | 9/2005 | DeLano | G06F 11/1405 714/10 |
| 8,688,963 | B2 | * | 4/2014 | Chaudhry | G06F 9/3842 712/216 |
| 9,003,225 | B2 | * | 4/2015 | Rafacz | G06F 9/3826 712/218 |
| 2011/0264898 | A1 | * | 10/2011 | Chaudhry | G06F 9/3842 712/228 |
| 2013/0151819 | A1 | * | 6/2013 | Piry | G06F 9/38 712/217 |
| 2015/0039860 | A1 | * | 2/2015 | Sundar | G06F 9/30032 712/208 |

* cited by examiner

*Primary Examiner* — Nadeem Iqbal
(74) *Attorney, Agent, or Firm* — Lowenstein Sandler LLP

(57) ABSTRACT

A checkpoint technique associated with an out of order based architecture of a processing device is described. An instruction may be received by its retirement unit and an identification as to whether the instruction is associated with a speculative error is performed. If the instruction is associated with the speculative error, then a first operation may be performed to replace state values of a first checkpoint of the processing device with state values of a second checkpoint. If the instruction is not associated with the speculative error, then the second checkpoint state may be updated based on the instruction.

23 Claims, 12 Drawing Sheets

CHECKPOINTS ASSOCIATED WITH AN OUT OF ORDER ARCHITECTURE

TECHNICAL FIELD

Embodiments described herein generally relate to processing devices and, more specifically, relate to checkpoints associated with an out of order architecture of a processing device.

BACKGROUND

A processing device may be based on an out of order (OOO) architecture. An OOO-based processing device may execute instructions in an order based on the availability of input data rather than by the original order of the instructions as provided by a program. By using such an OOO scheme, the processing device may make use of instruction cycles that would otherwise be idle while data is retrieved for the next instruction in a program.

DESCRIPTION OF EMBODIMENTS

Figure 1:
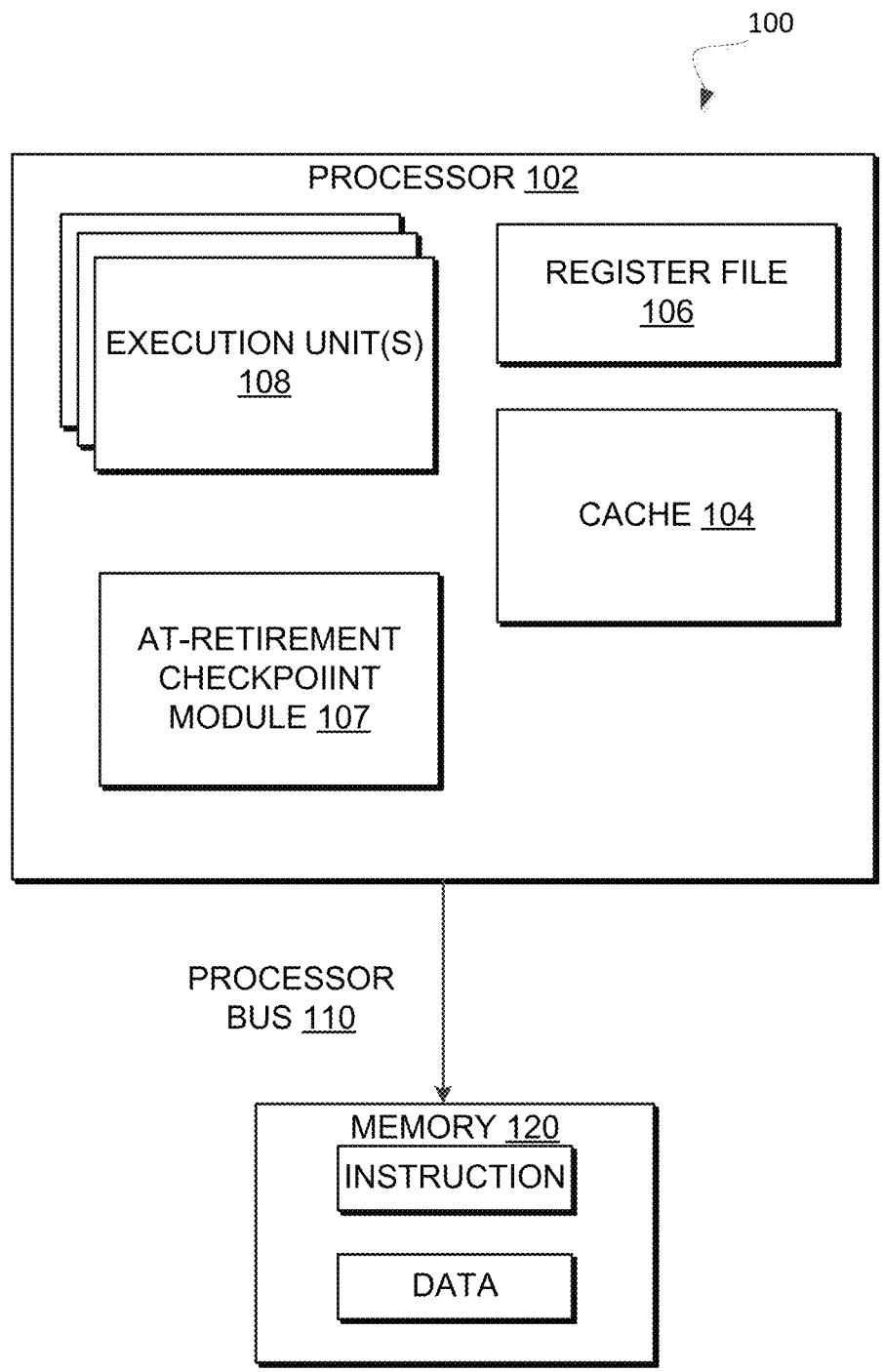
FIG. 1 is a block diagram illustrating a computing system that implements an at-retirement checkpoint module for providing checkpoints in accordance with some embodiments.

Described herein is a checkpoint technology in an out of order architecture. In some embodiments, the checkpoint technology may be used to improve the performance of a processor, processing device, or a processor-based system. For example, the checkpoint technology may be used to improve the performance of an out of order (OOO) execution based processor. A processor includes multiple functional units and memory channels. The processor may include an at-retirement checkpoint module that includes function blocks that may be used to update one or more checkpoints of a processing device based on conditions associated with instructions at an in-order retirement stage of an out of order instruction pipeline of the processing device.

Modern microprocessor-based products, including a System on a Chip (SoC), clients, servers, and hardware accelerators, may utilize checkpoints to implement advanced speculative software optimization and/or fault tolerance. For example, checkpoints may store a snapshot of the current architectural state of a processing device that may be used later to restart the execution of the processing device from a particular previous state. The checkpoint may represent a snapshot of the processing device's register and memory states that constitute its architectural state. The managing of the checkpoints may be based on instructions processed in an instruction pipeline. The instruction pipeline may process a sequence of instructions. An instruction in the pipeline may be referred to as an in-flight instruction if the instruction has been allocated to the pipeline but not yet completed the execution and/or determined to be eligible for retirement from the pipeline by an instruction retirement unit in a processing device. The use of checkpoints for the in-flight instructions may require multiple checkpoints (e.g., physical storage inside the device that may also be referred to as checkpoint buffers) to store a snapshot of the current sate of the processing device. However, if the processing device utilizes an out of order architecture, then the in-flight instructions in the instruction pipeline may not impact the architectural state of the processing device. Instead, with an out of order based processing device, the in-flight instructions may impact the state of the processing device only at their retirement from the pipeline (e.g., after their execution is complete and they become eligible for retirement). Thus, the state of in-flight instructions in an instruction pipeline of an out of order based processing device may be managed by its out of order based speculation support mechanisms until their retirement and hardware for a single checkpoint buffer may be used at retirement, as opposed to hardware for multiple checkpoint buffers that would be required for instructions in-flight. A synchronization between in-flight architectural states or a sequence of future checkpoints in the pipeline of an out of order based processing device may be used to allow the hardware for the single checkpoint buffer to support an unlimited number of in-fight checkpoints. Thus, such a checkpoint technique may result in advantageous hardware designs by simplifying circuitry needed to manage the checkpoints of an out of order based processing device.

FIG. 1 is a block diagram illustrating a computing system 100 that implements an at-retirement checkpoint module 107 for providing and updating checkpoints associated with a state of a processor 102 in accordance with some embodiments. The computing system 100 is formed with a processor 102 that includes one or more execution units 108 to execute an instruction (e.g., a commit instruction as described in further detail below or an add, load, store, branch, etc. instruction) in accordance with one or more embodiments as described herein. In short, the at-retirement checkpoint module 107 maintains and updates checkpoints of the processor 102 based on instructions obtained via memory accesses to the main memory 120 and/or the cache memory 104 via one or more memory channels and the at-retirement checkpoint module 107 coordinates or manages the updating of checkpoints based on conditions associated with the instructions. For example, instructions retrieved from the main memory 120 may be placed into an instruction pipeline of the processor 102 and may be executed or not executed based on conditions associated with the instructions. Additional details with regard to an at-retirement checkpoint module 107 are described in more detail below with respect to FIGS. 2-6.

Computing system 100 includes a component, such as a processor 102, to employ execution units 108 including logic to perform algorithms for processing data in accordance with the embodiments described herein. System 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes, and the like) may also be used. In one embodiment, sample computing system 100 executes a version of the WINDOWS™ operating system available from Microsoft Corporation of Redmond, Wash., although other operating systems (e.g., UNIX and Linux), embedded software, and/or graphical user interfaces may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Examples of handheld devices include, but are not limited to, cellular phones, Internet Protocol devices, digital cameras, personal digital assistants (PDAs), and handheld PCs. Embedded applications may include, but are not limited to, a micro controller, a digital signal processor (DSP), system on a chip (SoC), network computers (NetPC), set-top boxes, network hubs, wide area network (WAN) switches, or any other system that can perform one or more instructions in accordance with at least one embodiment.

In the illustrated embodiment of FIG. 1, processor 102 includes one or more execution units 108 to implement an algorithm that is to perform at least one instruction. One embodiment may be described in the context of a single processor desktop or server system, but alternative embodiments may be included in a multiprocessor system. System 100 may be an example of a 'hub' system architecture. The computer system 100 includes a processor 102 to process data signals. The processor 102, as one illustrative example, includes a complex instruction set computer (CISC) microprocessor, a reduced instruction set computing (RISC) microprocessor, a very long instruction word (VLIW) microprocessor, a processor implementing a combination of instruction sets, an out of order based processor, or any other processor device, such as a digital signal processor, for example. The processor 102 is coupled to a processor bus 110 that transmits data signals between the processor 102 and other components in the system 100, such as main memory 120 storing instruction, data, or any combination thereof. The other components of the system 100 may include, but are not limited to, a graphics accelerator, a memory controller hub, an I/O controller hub, a wireless transceiver, a Flash BIOS, a network controller, an audio controller, a serial expansion port, and an I/O controller. These elements perform their conventional functions that are well known to those familiar with the art.

In one embodiment, the processor 102 includes a Level 1 (L1) internal cache memory 104. Depending on the architecture, the processor 102 may have a single internal cache memory or multiple levels of internal cache memories (e.g., L1 and L2). Other embodiments include a combination of both internal and external caches depending on the particular implementation and needs. Register file 106 is to store different types of data in various registers including, but not limited to, integer registers, floating point registers, vector registers, banked registers, shadow registers, checkpoint registers, status registers, configuration registers, and instruction pointer registers.

Execution unit 108, including logic to perform integer and floating point operations, also resides in the processor 102. It should be noted that the execution unit may or may not have a floating point unit. The processor 102, in one embodiment, includes a microcode (ucode) ROM to store microcode, which when executed, is to perform algorithms for certain macroinstructions or handle complex scenarios. Here, microcode is potentially updateable to handle logic bugs/fixes for processor 102.

Alternate embodiments of an execution unit 108 may also be used in micro controllers, embedded processors, graphics devices, DSPs, and other types of logic circuits. System 100 includes a main memory 120. Main memory 120 may include, but is not limited to, a dynamic random access memory (DRAM) device, a static random access memory (SRAM) device, flash memory device, or other memory device. Main memory 120 stores instructions and/or data represented by data signals that are to be executed by the processor 102. The processor 102 is coupled to the main memory 120 via a processor bus 110. A system logic chip, such as a memory controller hub (MCH) may be coupled to the processor bus 110 and main memory 120. An MCH can provide a high bandwidth memory path to memory 120 for instruction and data storage and for storage of graphics commands, data and textures. The MCH can be used to direct data signals between the processor 102, main memory 120, and other components in the system 100 and to bridge the data signals between processor bus 110, main memory 120, cache memory 104, and system I/O, for example. The MCH may be coupled to main memory 120 through a memory interface. In some embodiments, the system logic chip can provide a graphics port for coupling to a graphics controller through an Accelerated Graphics Port (AGP) interconnect. The system 100 may also include an I/O controller hub (ICH). The ICH can provide direct connections to some I/O devices via a local I/O bus. The local I/O bus is a high-speed I/O bus for connecting peripherals to the main memory 120, chipset, and processor 102. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

For another embodiment of a system, the at-retirement checkpoint module 107 may be used with a system on a chip. One embodiment of a system on a chip includes a processor and a memory. The memory for one such system is a flash memory. The flash memory may be located on the same die as the processor and other system components. Additionally, other logic blocks, such as a memory controller or graphics controller, may also be located on a system on a chip.

Figure 2:
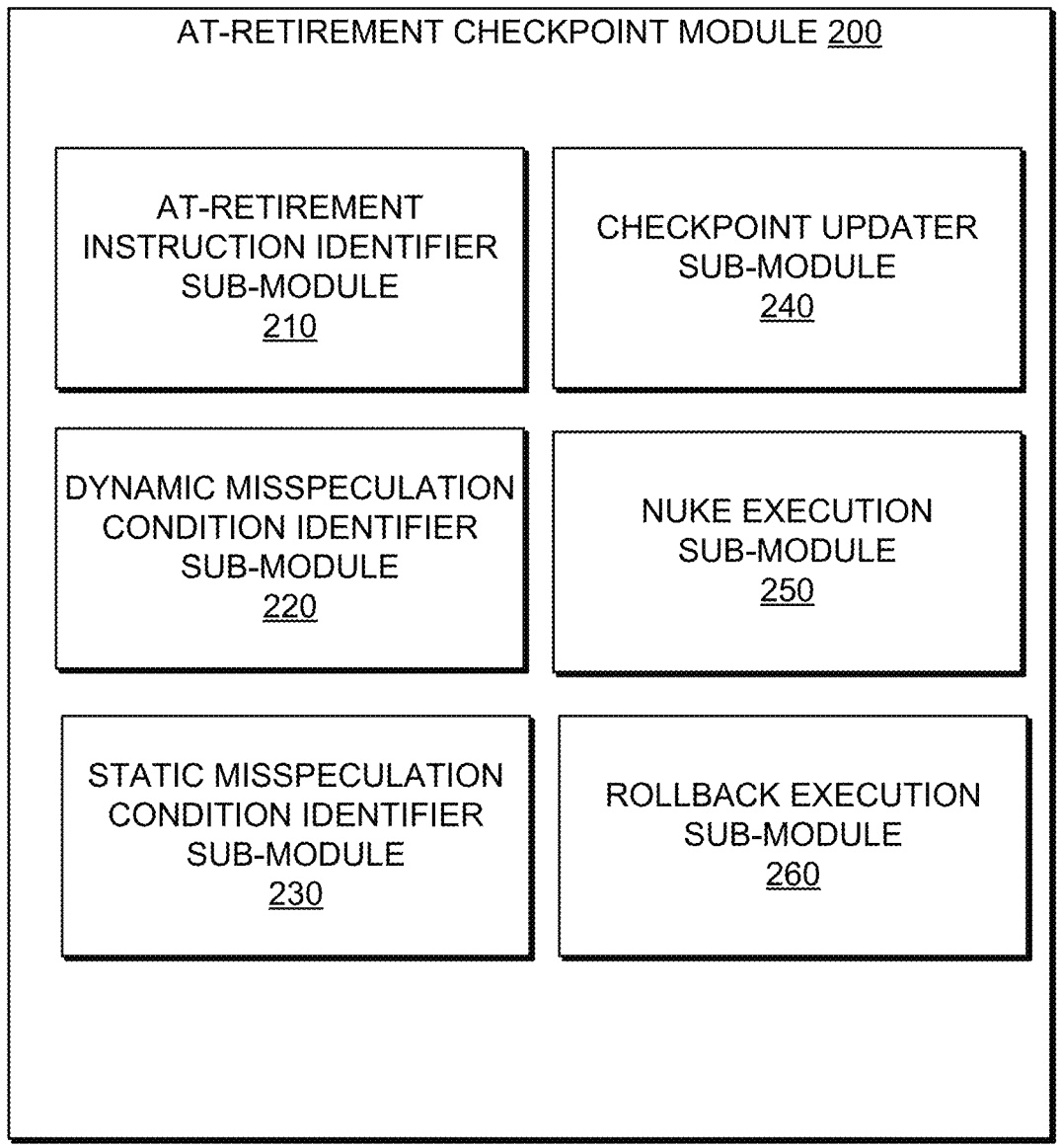
FIG. 2 is a block diagram illustrating an at-retirement checkpoint module in accordance with some embodiments of the disclosure.

FIG. 2 is a block diagram illustrating an example at-retirement checkpoint module 200 in accordance with some embodiments of the disclosure. The at-retirement checkpoint module 200 may correspond to the at-retirement checkpoint module 107 of FIG. 1. In general, the at-retirement checkpoint module 200 may include an at-retirement instruction identifier sub-module (or function block) 210, a dynamic misspeculation condition identifier sub-module (or function block) 220, a static misspeculation condition identifier sub-module (or function block) 230, a checkpoint updater sub-module (or function block) 240, a nuke execution sub-module (or function block) 250, and a rollback execution sub-module (or function block) 260. In alternative embodiments, the functionality of one or more of the sub-modules may be combined or divided. For example, a single sub-module may perform the functionality of the at-retirement instruction identifier sub-module 210, dynamic misspeculation condition identifier sub-module 220, static misspeculation condition identifier sub-module 230, checkpoint updater sub-module 240, nuke execution sub-module 250, and rollback execution sub-module 260. Alternatively, the functionality of each of the sub-modules 210, 220, 230, 240, 250, and 260 may be separated between multiple sub-modules.

As shown in FIG. 2, the at-retirement checkpoint module 200 may include an at-retirement instruction identifier sub-module 210. The at-retirement instruction identifier sub-module 210 may identify an instruction eligible for retirement from pipeline in an instruction window of an out of order architecture of a processing device. For example, the at-retirement instruction identifier sub-module 210 may identify a retiring instruction as a commit instruction or identify the instruction as not being a commit instruction (e.g., any instructions in an ISA such as load instructions, store instructions, branch instructions, etc.). In some embodiments, an in-flight instruction may refer to an instruction in the instruction window that has been allocated to the pipeline but has not yet been executed or determined that the instruction will be executed, or not yet eligible for retirement from the pipeline. Furthermore, an instruction window may refer to a set of instructions that may be concurrently handled in a pipeline of an out of order processing device (e.g., a processor with speculative out of order execution support). For example, the instruction window may be managed by out of order execution support mechanisms such as a Reorder Buffer (ROB) and/or a memory order buffer (MOB). Any instruction in the instruction window may be executed out of order with respect to its relative order in the software program code (e.g., when input operands to a younger or later allocated instruction are ready before those of an older or earlier allocated instruction). In some embodiments, the instruction window may be of a particular size and new instructions may be allocated and enter the instruction window when another instruction has been retired (e.g., a determination has been made that this and other instructions in the window were successfully executed) and has left the instruction window. In some embodiments, instructions may enter and leave the instruction window in program order and an instruction may leave the instruction window when it is the oldest instruction in the instruction window in the program order and has been successfully completed or executed. Thus, the instruction window may be seen as a type of window sliding along the program ordered stream of instructions within which instructions may become processed out of order. The state of all instructions within the instruction window may be speculative until the instruction has been committed or retired (e.g., the effects of the instruction execution are not applied to the architecturally visible state of CPU until then).

Returning to FIG. 2, the at-retirement checkpoint module 200 may include a dynamic misspeculation condition identifier sub-module 220 and a static misspeculation condition identifier sub-module 230. In some embodiments, a speculatively processing device (e.g., a CPU with speculative execution support) may use speculative execution or speculative instructions to reduce the cost of conditional branch instructions by using schemes that predict the execution path of a program (e.g., based on the history of branch executions). For example, in order to improve performance and utilization of a processing device, instructions may be scheduled or allocated at a time when it has not yet been determined that the instructions will need to be executed. Such instructions may be referred to as speculative instructions. For example, speculative instructions may be based on branch prediction of a control flow path through the program, but such speculative instructions may or may not be executed by the processing device. Thus, a speculation error condition may be identified during or after the program code execution (e.g. if a prediction turns out to be wrong). In some embodiments, a first speculation error condition (e.g., dynamic misspeculation) and a second speculation error condition (e.g., static misspeculation) may be identified by the dynamic misspeculation condition identifier sub-module 220 and the static misspeculation condition identifier sub-module 230.

In some embodiments, dynamic misspeculation may be associated with a hardware out of order pipeline of a processing device, e.g., resulting from speculative functions of hardware and static misspeculation may be associated with software program code, e.g., resulting from speculative assumptions made during the program code generation, like those that may be produced by a dynamic binary translator (DBT) associated with the processing device. In some embodiments, a DBT may refer to a dynamic binary translator that receives a sequence of code or instructions and translates the code or instructions. For example, a first sequence of instructions (e.g., x86 instructions) may be translated to a second sequence of corresponding instructions. Thus, the dynamic misspeculation condition identifier sub-module 220 may identify a misspeculation condition associated with an executed instruction that has been introduced by an out of order pipeline such as a speculative instruction along incorrectly predicted control flow path (e.g., an instruction that will not be committed or retired, but may or may not be executed). Furthermore, the static misspeculation condition identifier sub-module 230 may identify a misspeculation associated with a software program code such as, speculatively eliminated by a dynamic binary translator control flow path in the program code that turns out to be the correct control-flow path. As an example, the misspeculation introduced by a dynamic binary translator may include, but is not limited to, an assumption of no interrupt or an exception to happen during program code execution, while an interrupt or an exception actually happens during the code execution. An interrupt may refer to a signal to the processor emitted by hardware or software indicating an event that requires immediate attention. In some embodiments, an exception may refer to anomalous or exceptional events requiring special processing that may change the normal flow of program execution of instructions.

The at-retirement checkpoint module 200 may include a checkpoint updater sub-module 240. For example, the updating of a checkpoint may result in updating a value of the state values stored in a checkpoint. In some embodiments, the checkpoint updater sub-module 240 may simultaneously update multiple values of the state values stored in a checkpoint. In some embodiments, the checkpoint updater sub-module 240 may simultaneously update all values of the state stored in a checkpoint. In some embodiments, the latter update of all values in a checkpoint is performed atomically by its effect on the checkpointed state, i.e. indivisibly into an equivalent sequence of updates of any subsets of values stored in a checkpoint. In some embodiments, the checkpoint updater sub-module 240 may update a checkpoint corresponding to a valid non-speculative architectural state of an out of order based processing device. For example, the checkpoint updater sub-module 240 may update a pipeline allocation state, a pipeline retirement state, and/or a last commit state based on types of instructions and conditions of the instructions as is discussed in further detail below. In some embodiments, the last commit state may be a state kept in the commit checkpoint that is equal to a retirement state at a moment of an at-retirement execution of a last commit instruction.

As shown in FIG. 2, the at-retirement checkpoint module 200 may include a nuke execution sub-module 250 and a rollback execution sub-module 260. In some embodiments, the nuke execution sub-module 250 may perform a nuke operation. In the same or alternative embodiments, the nuke operation may update or restore a pipeline allocation state associated with a processing device with a chronologically last values of a pipeline retirement state associated with the processing device and may further flush a memory order buffer (MOB) state and a state of an out of order pipeline associated with the instruction window. In some embodiments, a processing device execution will proceed from a restored state by a nuke operation pipeline allocation state. Furthermore, the rollback execution sub-module 260 may perform a rollback operation. In the same or alternative embodiments, the rollback operation may update the pipeline allocation state of the processing device with values of a last successful commit state associated with the processing device and may further flush the MOB state and a state of an out of order pipeline associated with the instruction window, and a speculative state of data cache unit (S-DCU). The speculative state of data cache units may capture memory effects of all executed store operations, which may be validated as not affected by a dynamic misspeculation error (e.g., the stores that passed the out of order pipeline retirement stage), but not yet validated as not affected by a static misspeculation error (e.g., the commit instruction associated in the software program code with the stores is not executed and retired yet by the pipeline of the processing device). In some embodiments, the rollback operation may further update the retirement state with a value of the last commit state. Further details with regard to the nuke operation and the rollback operation are disclosed in additional detail below.

Figure 3:
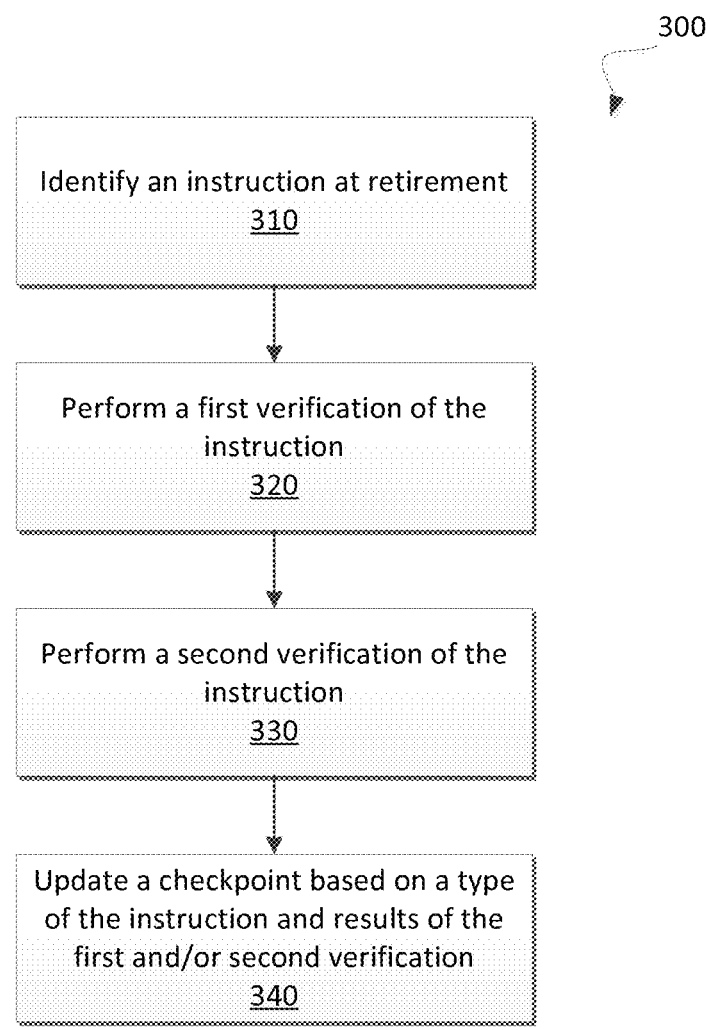
FIG. 3 is a flow diagram of a method to update a checkpoint of an out of order based processing device in accordance with some embodiments.

FIG. 3 is a flow diagram of a method to update a checkpoint of an out of order based processing device in accordance with some embodiments. In some embodiments, the method 300 may be performed by the at-retirement checkpoint module 107 or 200. For example, the method 300 may be used by the at-retirement checkpoint module 107 of FIG. 1 or the at-retirement checkpoint module 200 of FIG. 2 to update or manage a checkpointed state or allocation state or at-retirement state of a processor 102. The method 300 may also be performed by processing logic that may comprise hardware (e.g., circuitry, dedicated logic, programmable logic, microcode, etc.), software, firmware, or a combination thereof. Alternatively, other components of the computing system 100 may perform some or all of the operations of the method 300.

As shown in FIG. 3, the method 300 may begin with the processing logic identifying, at block 310, an instruction at retirement. In some embodiments, the instruction may be identified as a commit instruction. A commit instruction may refer to an instruction that creates or updates a checkpoint. In some embodiments, the method may also identify that the instruction is not a commit instruction. The processing logic may perform a first verification of the instruction (block 320). In some embodiments, first verification may be associated with a dynamic misspeculation detection. For example, the first verification may be to determine whether the instruction is associated with a dynamic misspeculation caused by an out of order pipeline processing. The processing logic may further perform a second verification of the instruction (block 330). In some embodiments, second verification may be associated with static misspeculation detection. For example, the second verification may be to determine whether the instruction is associated with a static misspeculation caused by binary code optimizations introduced speculatively by a dynamic binary translator associated with a processing device.

The method 300 may further update a checkpoint corresponding to a state of a processing device based on a type of the instruction and the results of the first verification and the second verification of the instruction. For example, a retirement state may be updated if an instruction is not associated with a dynamic misspeculation. Furthermore, if the instruction is a commit instruction, then a last commit state may be updated if there is no static misspeculation associated with the commit instruction. Additional details with regard to updating an allocation state, a retirement state, and a last commit state are disclosed in additional detail below.

Figure 4:
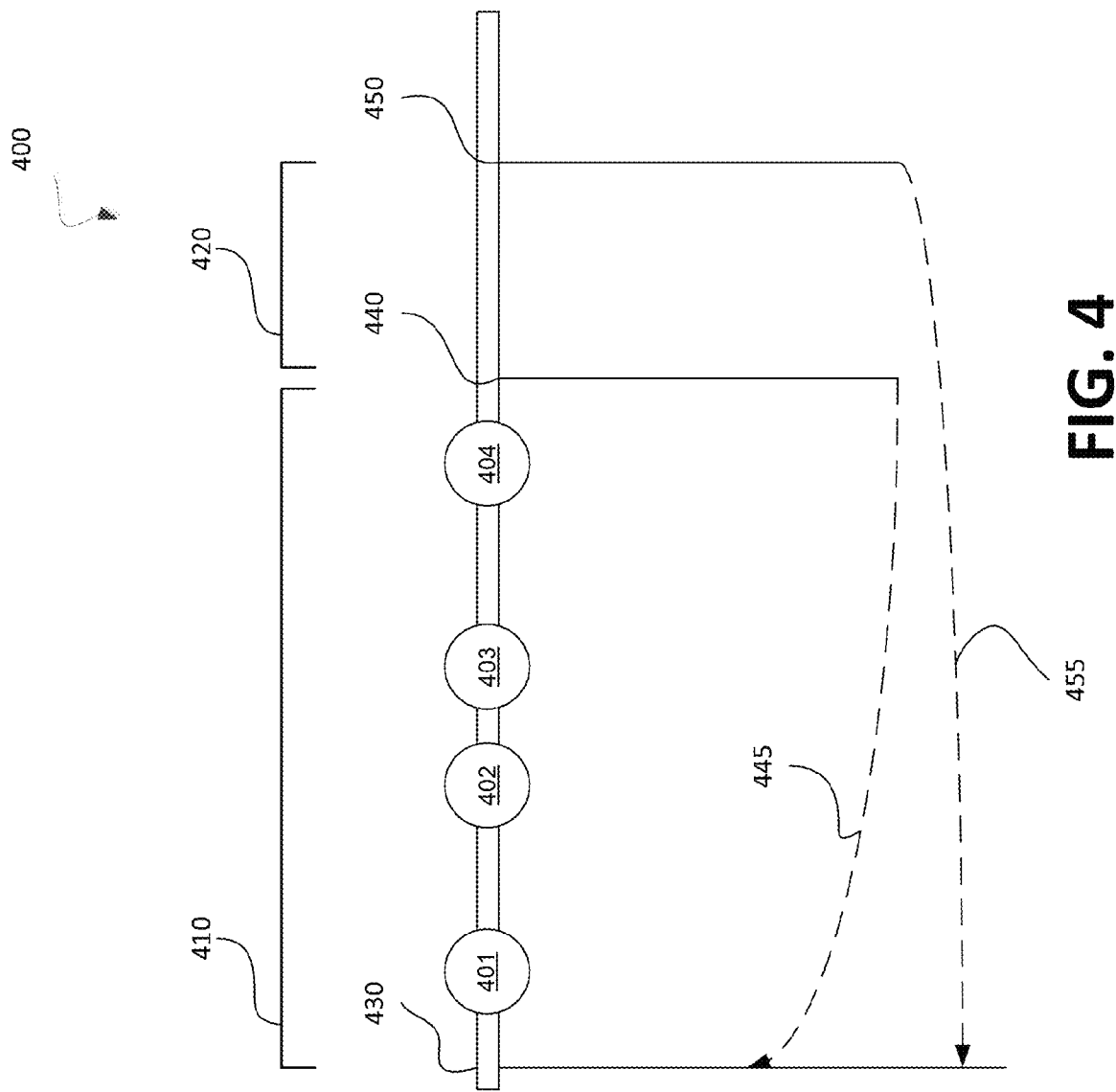
FIG. 4 illustrates an example out of order instruction pipeline with instructions at various stages or phases in accordance with some embodiments.

FIG. 4 illustrates an example out of order instruction pipeline 400 with instructions at various stages or phases in accordance with some embodiments. In general, the out of order instruction pipeline 400 may include instructions associated with a processing device (e.g., processor 102) and/or implemented by an at-retirement checkpoint module 107 of FIG. 1 or an at-retirement checkpoint module 200 of FIG. 2.

As shown in FIG. 4, the out of order instruction pipeline 400 may include a first portion 410 and a second portion 420. In some embodiments, the first portion 410 of the out of order instruction pipeline may correspond to its stages or a phase relating to a dynamically speculative out of order state. Furthermore, the second portion 420 of the out of order instruction pipeline 400 may correspond to its stages or a phase relating to a statically speculative state. In some embodiments, the point 430 at the start of the first portion 410 may indicate a point where instructions have been allocated to the out of order instruction pipeline 400. An allocation state of the pipeline logically corresponds to the point 430. For example, the instructions 401, 402, 403, and 404 in the first portion 410 of the out of order instruction pipeline 400 may be allocated after progressing through an allocation stage (e.g., point 430) and may be referred to as in-flight instructions. Furthermore, the point 440 may represent when an in-flight instruction (e.g., instructions 401, 402, 403, and/or 404) becomes eligible for retirement from an out of order pipeline and is being retired (e.g., a determination that the instruction was successfully executed and it is the oldest not yet retired instruction in the instruction window). A retirement state of the pipeline logically corresponds to the point 440. Thus, the start of the first portion 410 may be considered to be the point 430 (e.g., the allocation stage) and the end of the portion 410 may be considered to be the point 440 (e.g., the retirement stage). Furthermore, the start of the second portion 420 of the out of order instruction pipeline 400 may be considered to be the point 440 (e.g., the retirement stage) and the end of the portion 420 may be the point 450 which may represent a last successful executed and retired commit instruction stage.

In some embodiments, each of the points 430, 440, and 450 may be associated with a checkpoint that holds correspondent state of the pipeline. For example, a register alias table (RAT) may be associated with each of the points 430, 440, and 450. In some embodiments, the point 430 may be associated with an allocation RAT (A-RAT), the point 440 may be associated with a retirement RAT (R-RAT), and the point 450 may be associated with a last commit RAT (C-RAT). In the same or alternative embodiments, the register alias table may include references or pointers to physical registers corresponding to logical ISA registers associated with a state of a processing device. For example, the A-RAT may include references or pointers to physical registers that represent an allocation state, the R-RAT may include references or pointers to physical registers that represent a retirement state, and the C-RAT may include references or pointers to physical registers that represent the last committed state of a processing device, resulting from successful execution and retirement of a commit instruction. Thus, the register alias tables (RATs) may be considered to be a mapping from logical registers to corresponding physical registers.

Returning to FIG. 4, the A-RAT associated with point 430 may be updated when an instruction has been allocated to the out of order instruction pipeline 400. For example, the A-RAT may be updated to record a change in state of the processing device associated with a destination register operand of an allocating instruction, so that younger allocating instructions can refer to the new allocation state. Furthermore, the R-RAT associated with point 440 may be updated with a destination register operand of an instruction, based on when the instruction in the out of order instruction pipeline 400 has been retired. For example, the R-RAT may be updated when any of the instructions 401, 402, 403, and 404 in the first portion 410 of the out of order pipeline 400 have been retired. For example, the R-RAT may be updated to record a state of the processing device after an instruction has been retired. Furthermore, the C-RAT associated with point 450 may be updated whenever a commit instruction has been retired. For example, the C-RAT may be updated to record a state of the processing device after a commit instruction has been executed and retired. The C-RAT update process may be also referred as a commit of the state to a checkpoint buffer. Thus, in some embodiments, the C-RAT may be atomically updated with the entire contents of the R-RAT when a commit instruction retires. Accordingly, the C-RAT may be considered a snapshot of the R-RAT when the commit instruction has retired.

In some embodiments, the A-RAT may be updated with the contents of the R-RAT or the C-RAT in response to certain conditions with instructions in the out of order instruction pipeline 400. For example, as previously described, a nuke operation 445 may be performed if an instruction is associated with a dynamic misspeculation. For example, if an instruction 401, 402, 403, and/or 404 is associated with a dynamic misspeculation, then a nuke operation 445 may be performed to copy the contents of the R-RAT to the A-RAT, along with other actions mentioned earlier. Thus, since the R-RAT represents the state of the out of order instruction pipeline 400 of the processing device whenever any instruction (e.g., either a commit instruction or not a commit instruction) has been retired, the nuke operation 445 may update the A-RAT with the contents of the R-RAT whenever an in-flight or not yet retired instruction is associated with a dynamic misspeculation or a dynamic misspeculation condition is identified for an instruction at retirement. In some embodiments, the nuke operation 445 may further flush (e.g., remove any instructions 401, 402, 403, and/or 404) from the out of order instruction pipeline 400, as well as flush some contents of MOB Furthermore, if the nuke operation 445 is not performed, a rollback operation 455 may be performed in response to another condition associated with instructions in the out of order instruction pipeline 400. For example, as previously described, the rollback operation 455 may be performed if an instruction is identified to be associated with a static misspeculation. For example, if an instruction 401, 402, 403, and/or 404 is determined to not be associated with a dynamic misspeculation, then the nuke operation 445 may not be performed to copy the contents of the R-RAT to the A-RAT. Thus, an instruction that does not trigger the nuke operation 445 may result in the updating of the R-RAT. However, a second determination may be made as to whether the instruction is associated with a static misspeculation. For example, if the instruction is not associated with a static misspeculation in the second portion 420 of the out of order instruction pipeline 400, then the rollback operation 455 may not be performed. Furthermore, if the instruction is not associated with a static misspeculation, then the C-RAT may be updated to represent a last committed state of the processing device if the instruction is a commit instruction. However, if the instruction is not a commit instruction, then the C-RAT may not be updated. In some embodiments, if the instruction is associated with a static misspeculation, then the contents of the C-RAT may be copied to the A-RAT. Furthermore, in some embodiments, the contents of the C-RAT may also be copied to the R-RAT in addition to the A-RAT. Furthermore, the instructions in the first portion 410 of the out of order instruction pipeline 400 may be flushed, contents of MOB may be flushed, and some contents of a speculative data cache unit (S-DCU) of the processing device may be also flushed. In some embodiments, the S-DCU may hold a speculative memory state. For example, in some embodiments, checkpoints of memory state may be represented by logically dividing cacheable memory into two state classes referred to as non-speculative memory state and speculative memory state. A non-speculative state may represent the committed memory state corresponding to the last retired commit instruction or a checkpoint, while a speculative state may represent the memory reads and/or updates corresponding to retired instructions that are younger than the last retired commit instruction. In some embodiments, the speculative memory state may contain data updates corresponding to uncommitted stores and data read by uncommitted loads. The uncommitted loads and stores passed the retirement stage, but may not be committed yet to the S-DCU state and are temporary kept by the MOB.

As such, the out of order instruction pipeline 400 may include a dynamically speculative out of order state or its portion and a statically speculative state or its portion. Furthermore, states corresponding to allocation, retirement, and last commit may be updated based on conditions of the in-flight and/or retiring instructions in the out of order pipeline 400.

Figure 5:
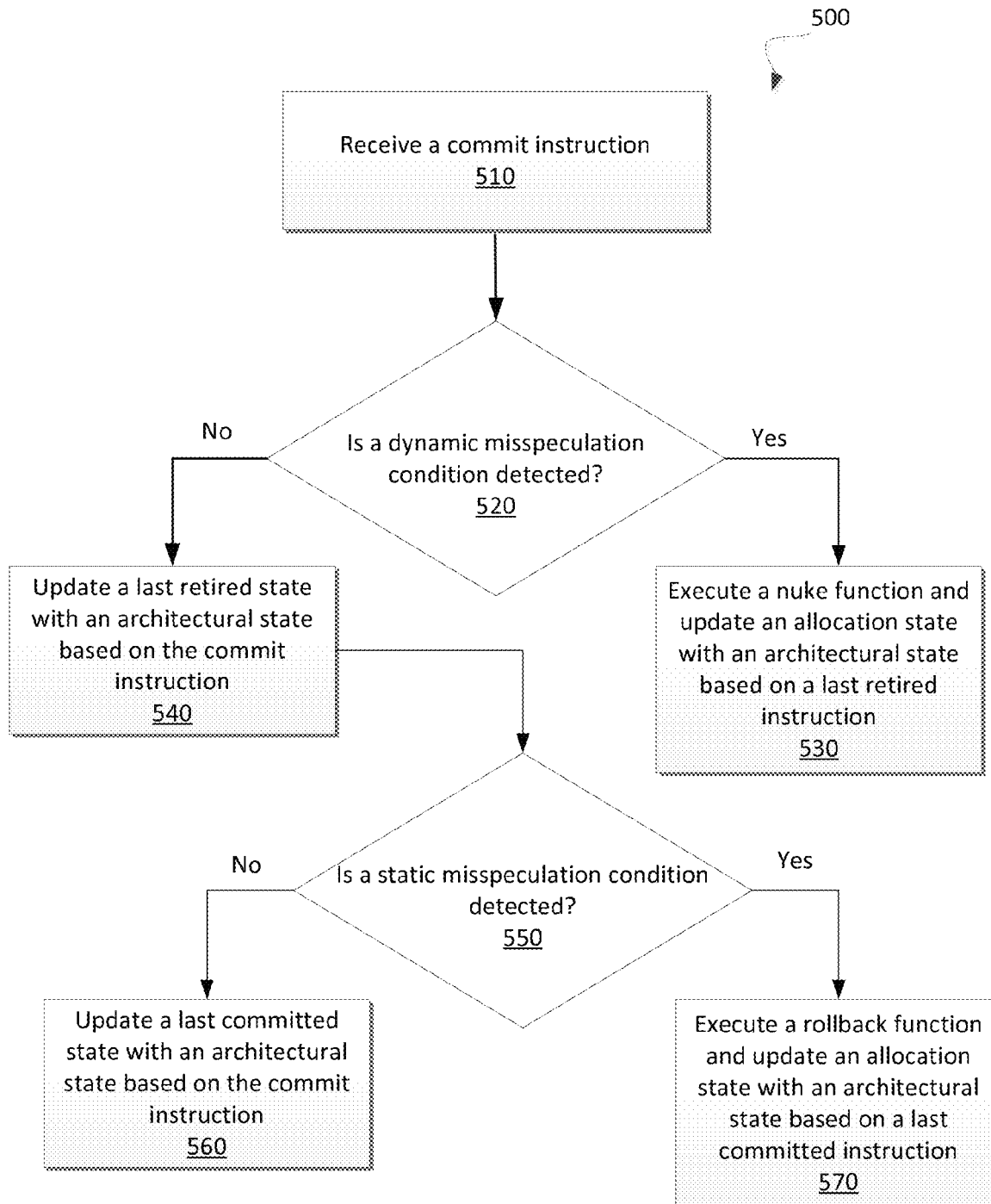
FIG. 5 illustrates a method to execute a rollback or nuke function based on dynamic or static misspeculation of a commit instruction in an out of order instruction pipeline in accordance with some embodiments of the disclosure.

FIG. 5 illustrates a method 500 to execute a rollback or nuke function based on dynamic or static misspeculation conditions for a commit instruction at a retirement stage in an out of order instruction pipeline in accordance with some embodiments of the disclosure. In general, the method 500 may be performed by processing logic that may comprise hardware (e.g., circuitry, dedicated logic, programmable logic, microcode, etc.), software, firmware, or a combination thereof. In some embodiments, the method 500 may be performed by the at-retirement checkpoint module 107 of FIG. 1 or the at-retirement checkpoint module 200 of FIG. 2. Alternatively, other components of the computing system 100 may perform some or all of the operations of the method 500.

As shown in FIG. 5, the method 500 may begin with the processing logic receiving a commit instruction (block 510). For example, a commit instruction may be identified at retirement stage in an out of order pipeline (e.g., at point 440 of out of order pipeline 400). The processing logic may further determine if one or more dynamic misspeculation conditions have been detected (block 520). For example, the processing logic may determine if the received commit instruction is associated with a dynamic misspeculation associated with the out of order instruction pipeline. If the commit instruction is associated with a dynamic misspeculation, then a nuke function or operation (e.g., nuke operation 445) may be performed in response to determining that the commit instruction is associated with the dynamic misspeculation (block 530). For example, the nuke operation may result in the updating of an A-RAT with the state values of an R-RAT. However, if the processing logic does not determine that the commit instruction is associated with a dynamic misspeculation, then a checkpoint associated with the last retired state may be updated with an architectural state based on the commit instruction (block 540). For example, an R-RAT may be updated to reflect the state of the processing device after the retirement of the commit instruction. The processing logic may further determine if a static misspeculation has been detected (block 550). For example, the processing logic may determine if the received commit instruction is associated with a static misspeculation associated with binary code optimizations introduced speculatively by a dynamic binary translator associated with a processing device and dynamically detected by the out of order instruction pipeline. If the commit instruction is associated with a static misspeculation (e.g., an interrupt or exception associated with a dynamic binary translator's assumption that no interrupt or exception will happen during the optimized code execution), then a rollback function or operation (e.g., rollback operation 455) may be performed in response to determining that the commit instruction is associated with the static misspeculation (block 570). For example, the rollback operation may result in the updating of an A-RAT and/or an R-RAT with the state values of a C-RAT. However, if the processing logic does not determine that the commit instruction is associated with a static misspeculation then a checkpoint state associated with the last committed state may be updated with an architectural state based on the commit instruction (block 560). For example, a C-RAT may be updated with contents of R-RAT state to reflect the state of the processing device after the retirement of the commit instruction that is not associated with a dynamic misspeculation and a static misspeculation. In some embodiments, block 540 may be bypassed (i.e., not performed) as redundant in a case when block 550 detects the static misspeculation condition and triggers a rollback function as specified at block 570.

Figure 6:
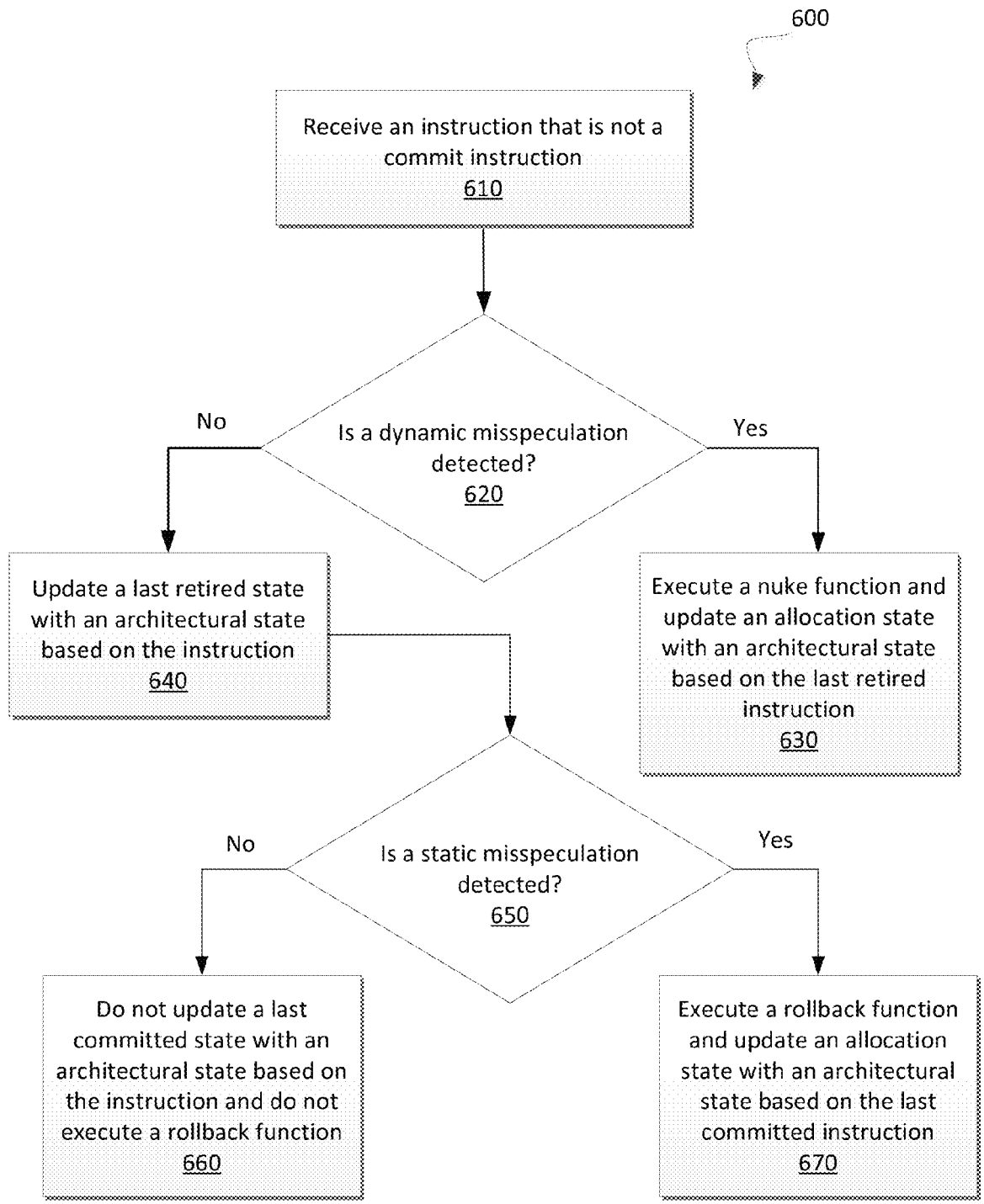
FIG. 6 illustrates a method to execute a rollback or nuke function based on dynamic or static misspeculation of an instruction that is not a commit instruction in an out of order instruction pipeline in accordance with some embodiments of the disclosure.

FIG. 6 illustrates a method 600 to execute a rollback or nuke function based on dynamic or static misspeculation conditions of an instruction that is not a commit instruction at a retirement stage in an out of order instruction pipeline in accordance with some embodiments of the disclosure. In general, the method 600 may be performed by processing logic that may comprise hardware (e.g., circuitry, dedicated logic, programmable logic, microcode, etc.), software, firmware, or a combination thereof. In some embodiments, the method 600 may be performed by the at-retirement checkpoint module 107 of FIG. 1 or the at-retirement checkpoint module 200 of FIG. 2. Alternatively, other components of the computing system 100 may perform some or all of the operations of the method 600.

As shown in FIG. 6, the method 600 may begin with the processing logic receiving an instruction (block 610). For example, an instruction that is not a commit instruction may be identified at retirement in an out of order instruction pipeline (e.g., at point 440 of out of order instruction pipeline 400). The processing logic may further determine if one or more dynamic misspeculation conditions have been detected (block 620). For example, the processing logic may determine if the received instruction is associated with a dynamic misspeculation associated with the out of order instruction pipeline. If the instruction is associated with a dynamic misspeculation, then a nuke function or operation (e.g., nuke operation 445) may be performed in response to determining that the instruction is associated with the dynamic misspeculation (block 630). For example, the nuke operation may result in the updating of an A-RAT with the state values of an R-RAT. However, if the processing logic does not determine that the instruction is associated with a dynamic misspeculation, then a checkpoint associated with the last retired state may be updated based on the instruction (block 640). For example, an R-RAT may be updated to reflect the state of the processing device after the retirement of the instruction. The processing logic may further determine if a static misspeculation has been detected (block 650). For example, the processing logic may determine if the received instruction is associated with a static misspeculation associated with binary code optimizations introduced speculatively by a dynamic binary translator associated with a processing device and dynamically detected by the out of order pipeline. If the instruction is associated with a static misspeculation (e.g., an interrupt or exception associated with a dynamic binary translator's assumption that no interrupt or exception will happen during the optimized code execution), then a rollback function or operation (e.g., rollback operation 455) may be performed in response to determining that the instruction is associated with the static misspeculation (block 670). For example, the rollback operation may result in the updating of an A-RAT and/or an R-RAT with the state values of a C-RAT. However, if the processing logic does not determine that the instruction is associated with a static misspeculation then a checkpoint state associated with the last committed state may not be updated with an architectural state based on the instruction (block 660), as the instruction is not a commit instruction. For example, a C-RAT may not be updated in response to retirement of an instruction that is not a commit instruction. In some embodiments, block 640 may be bypassed (i.e., not performed) as redundant in a case when the processing logic, at block 650, detects the static misspeculation condition and triggers a rollback function as described at block 670.

Figure 7:
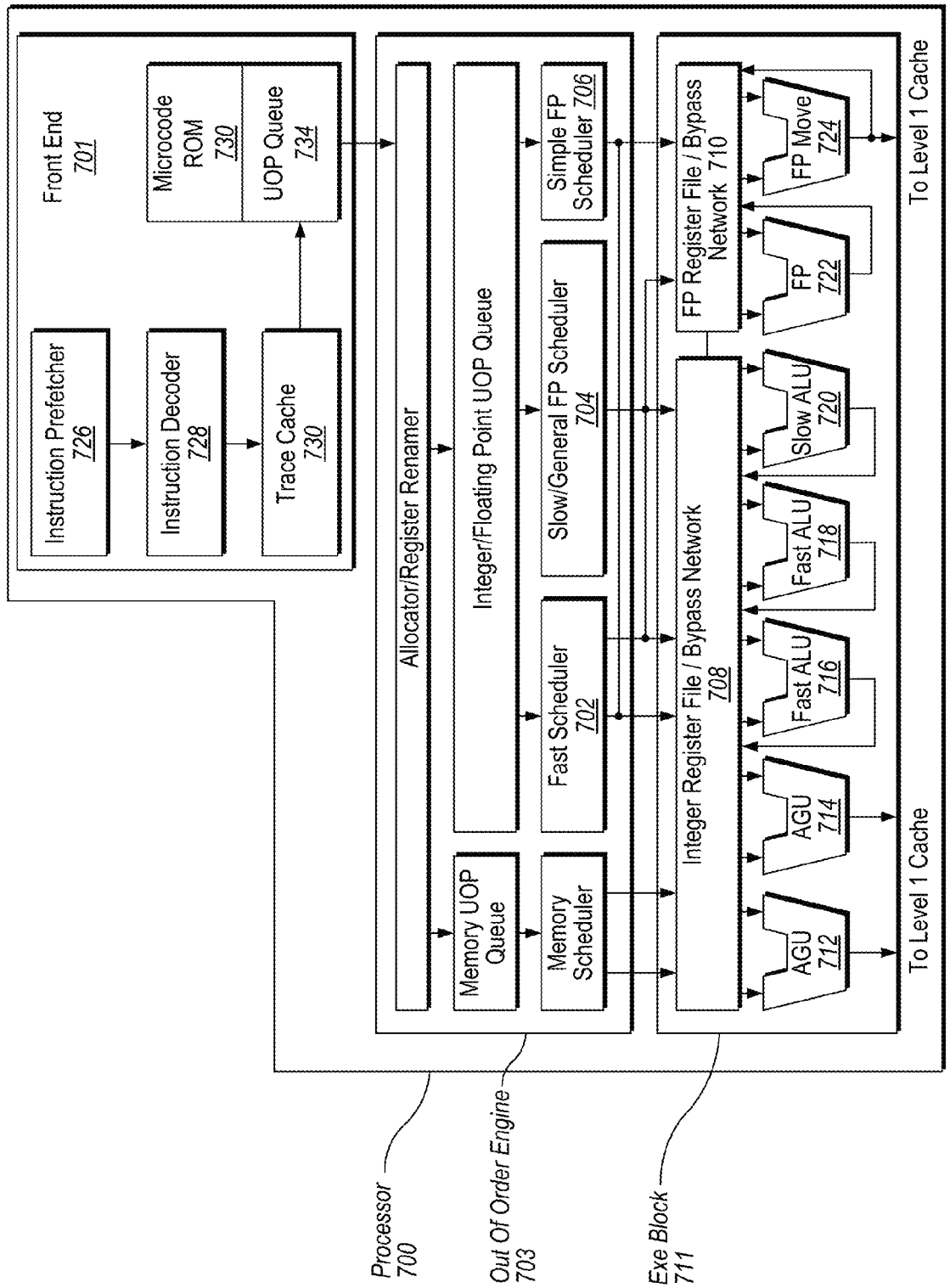
FIG. 7 illustrates a block diagram of the micro-architecture for a processor that includes logic circuits to manage checkpoints associated with an out of order instruction pipeline according to one embodiment.

FIG. 7 illustrates a block diagram of the micro-architecture for a processor 700 that includes logic circuits to manage checkpoints associated with an out of order architecture according to one embodiment. The at-retirement checkpoint module 107 and 200 may be implemented in the processor 700. In some embodiments, an instruction in accordance with one embodiment can be implemented to operate on data elements having sizes of byte, word, doubleword, quadword, etc., as well as data types, such as single and double precision integer and floating point data types. In one embodiment the in-order front end 701 is the part of the processor 700 that fetches instructions to be executed and prepares them to be used later in the processor pipeline.

The front end 701 may include several units. In one embodiment, the instruction prefetcher 716 fetches instructions from memory and feeds them to an instruction decoder 718 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 718 accesses the microcode ROM 732 to do the instruction. For one embodiment, an instruction can be decoded into a small number of micro ops for processing at the instruction decoder 718. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the microcode ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution. Although not shown, the out-of-order execution engine 703 may further include a retirement unit where the at-retirement checkpoint module as disclosed herein may be implemented. In some embodiments, the out-of-order execution engine 703 and the exe block 711 may notify the retirement unit with regard to the allocation and completion/execution of an instruction.

Register files 708, 710, sit between the schedulers 702, 704, 706, and the execution units 712, 714, 716, 718, 710, 712, 714 in the execution block 711. There is a separate register file 708, 710, for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 710, 712, 714, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 710, floating point ALU 712, floating point move unit 714. For one embodiment, the floating point execution blocks 712, 714, execute floating point, MMX, SIMD, and SSE, or other operations. The floating point ALU 712 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 710 as the slow ALU 710 includes integer execution hardware for long latency type of operations, such as a multiplier, shifts, flag logic, and branch processing. Memory load/store operations are executed by the AGUs 712, 714. For one embodiment, the integer ALUs 716, 718, 710, are described in the context of performing integer operations on 64 bit data operands. In alternative embodiments, the ALUs 716, 718, 710, can be implemented to support a variety of data bits including 16, 32, 128, 256, etc. Similarly, the floating point units 712, 714, can be implemented to support a range of operands having bits of various widths. For one embodiment, the floating point units 712, 714, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to manage checkpoints of an out of order architecture according to one embodiment. In one embodiment, the execution block 711 of processor 700 may include the checkpoint module 200, to manage checkpoints of an out of order architecture according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
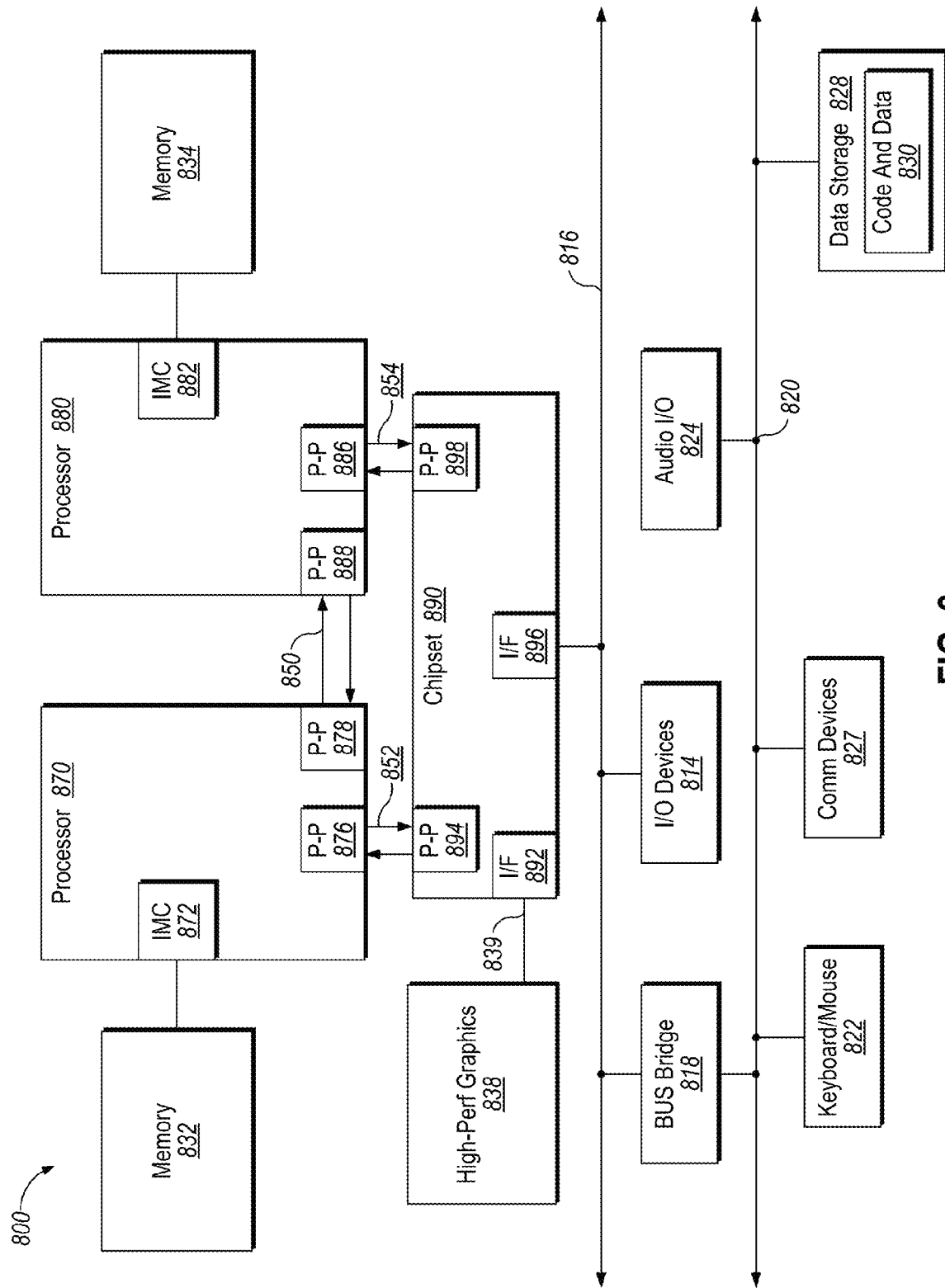
FIG. 8 is a block diagram of a computer system according to one implementation.

Embodiments may be implemented in many different system types. Referring now to FIG. 8, shown is a block diagram of a multiprocessor system 800 in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors. The processors each may include hybrid write mode logics in accordance with an embodiment of the present. In some embodiments, the at-retirement checkpoint modules 107 and 200 may be implemented in the multiprocessor system 800. For example, the at-retirement checkpoint modules 107 and 200 may be implemented in the processor 870 and/or the processor 880.

While shown with two processors 870, 880, it is to be understood that the scope of the present disclosure is not so limited. In other implementations, one or more additional processors may be present in a given processor.

Processors 870 and 880 are shown including integrated memory controller units 882 and 882, respectively. Processor 870 also includes as part of its bus controller units point-to-point (P-P) interfaces 876 and 888; similarly, second processor 880 includes P-P interfaces 886 and 888. Processors 870, 880 may exchange information via a point-to-point (P-P) interface 850 using P-P interface circuits 888, 888. As shown in FIG. 8, IMCs 882 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
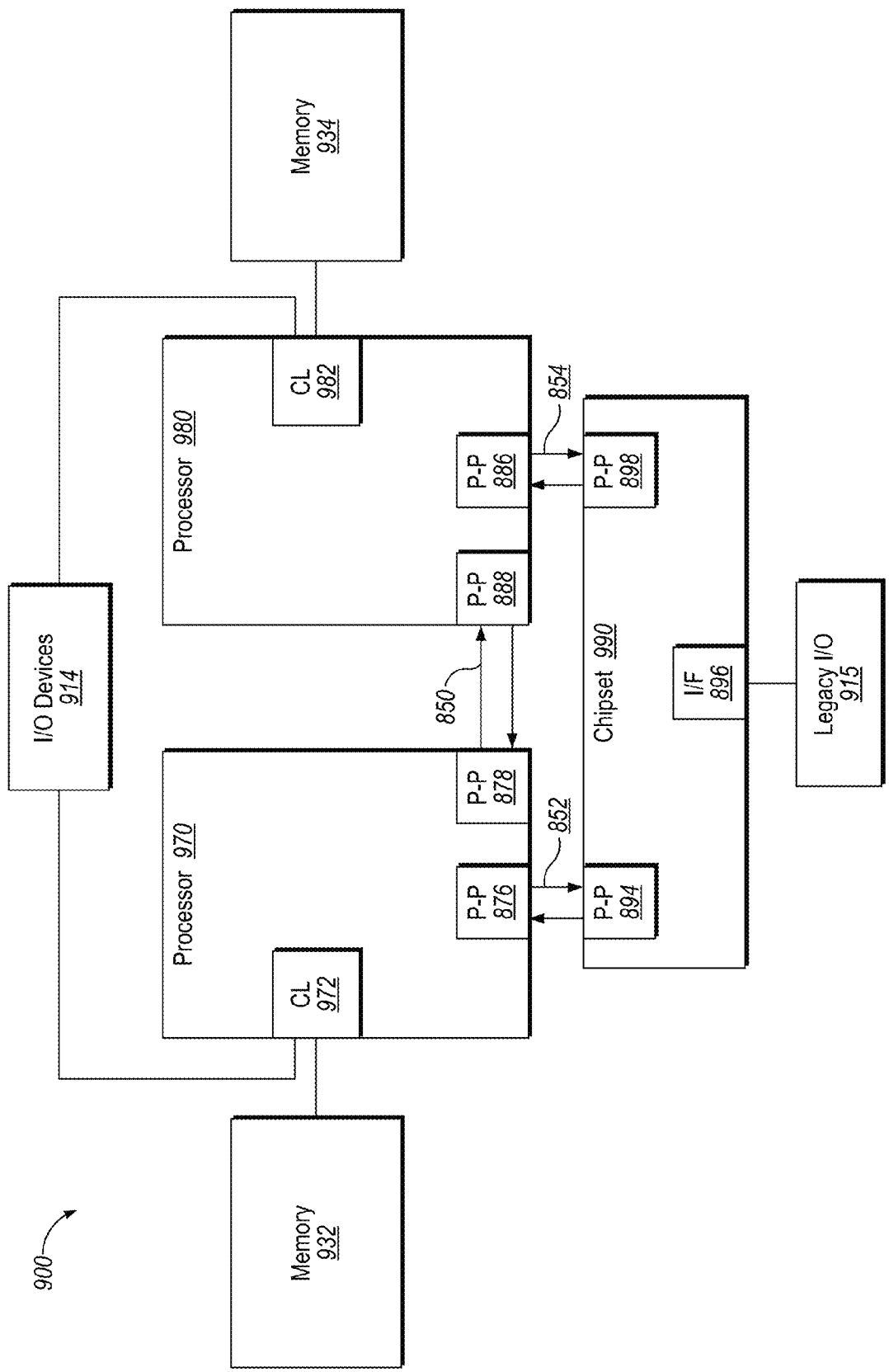
FIG. 9 is a block diagram of a computer system according to another implementation.

Referring now to FIG. 9, shown is a block diagram of a third system 900 in accordance with an embodiment of the present disclosure. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 970, 980 may include integrated memory and I/O control logic ("CL") 972 and 982, respectively. For at least one embodiment, the CL 972, 982 may include integrated memory controller units such as described herein. In addition. CL 972, 982 may also include I/O control logic. FIG. 9 illustrates that the memories 932, 934 are coupled to the CL 972, 982, and that I/O devices 915 are also coupled to the control logic 972, 982. Legacy I/O devices 915 are coupled to the chipset 990. In some embodiments, the at-retirement checkpoint modules 107 and 200 may be implemented in the system 900. For example, the at-retirement checkpoint modules 107 and 200 may be implemented in the processor 970 and/or the processor 980.

Figure 10:
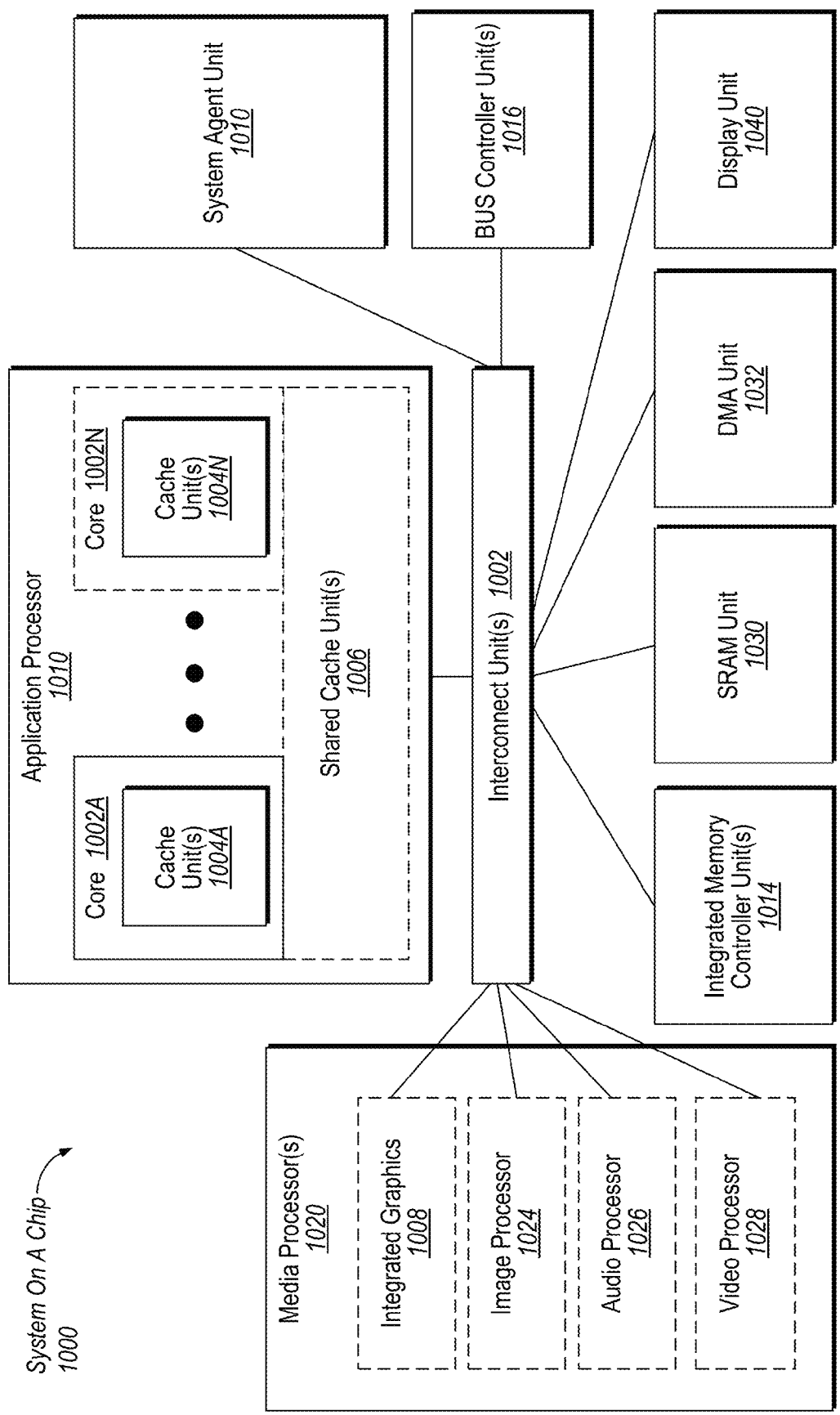
FIG. 10 is a block diagram of a system-on-a-chip according to one implementation.

FIG. 10 is an exemplary system on a chip (SoC) that may include one or more of the cores 1002. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 10, shown is a block diagram of a SoC 1000 in accordance with an embodiment of the present disclosure. Similar elements in FIG. 5 bear like reference numerals. Also, dashed lined boxes are features on more advanced SoCs. In FIG. 10, an interconnect unit(s) 1002 is coupled to: an application processor 1010 which includes a set of one or more cores 1002A-N and shared cache unit(s) 1006; a system agent unit 1010; a bus controller unit(s) 1016; an integrated memory controller unit(s) 1014; a set or one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays. In some embodiments, the at-retirement checkpoint modules 107 and 200 may be implemented in the SoC 1000. For example, the at-retirement checkpoint modules 107 and 200 may be implemented in the application processor 1010 and/or cores 1002A-N.

Figure 11:
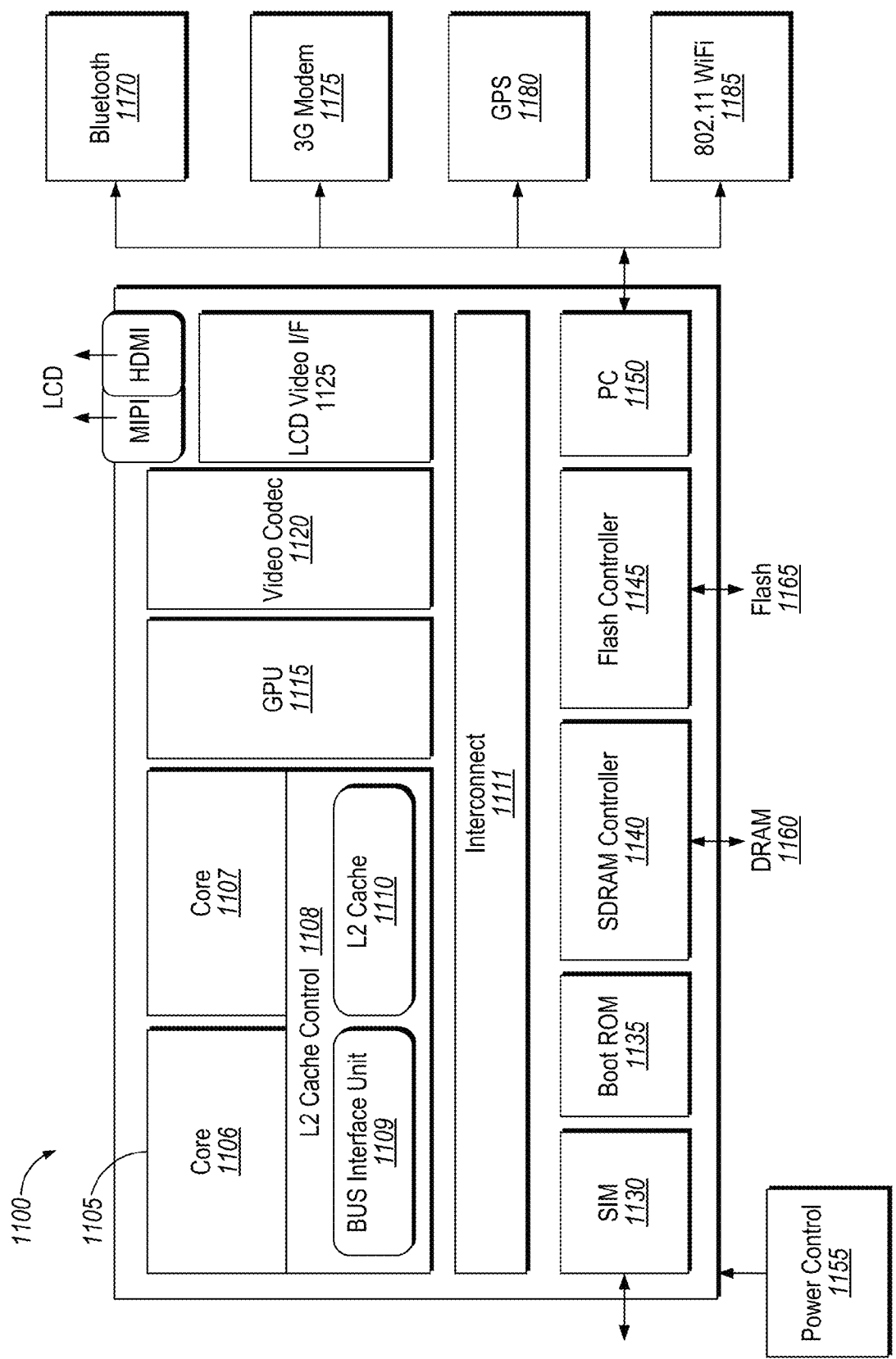
FIG. 11 illustrates another implementation of a block diagram for a computing system.

Turning next to FIG. 11, an embodiment of a system on-chip (SOC) design in accordance with embodiments of the disclosure is depicted. As an illustrative example, SOC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. In some embodiments, the at-retirement checkpoint modules 107 and 200 may be implemented in the SCC 1100. For example, the at-retirement checkpoint modules 107 and 200 may be implemented in the core 1106 and/or core 1107.

Here, SOC 1100 includes two cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SOC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the embodiments described herein.

In addition, the system illustrates peripherals for communication, such as a Bluetooth module 1170, 3G modem 1175, GPS 1180, and Wi-Fi 1185. Note as stated above, a UE includes a radio for communication. As a result, these peripheral communication modules may not all be included. However, in a UE some form of a radio for external communication should be included.

Figure 12:
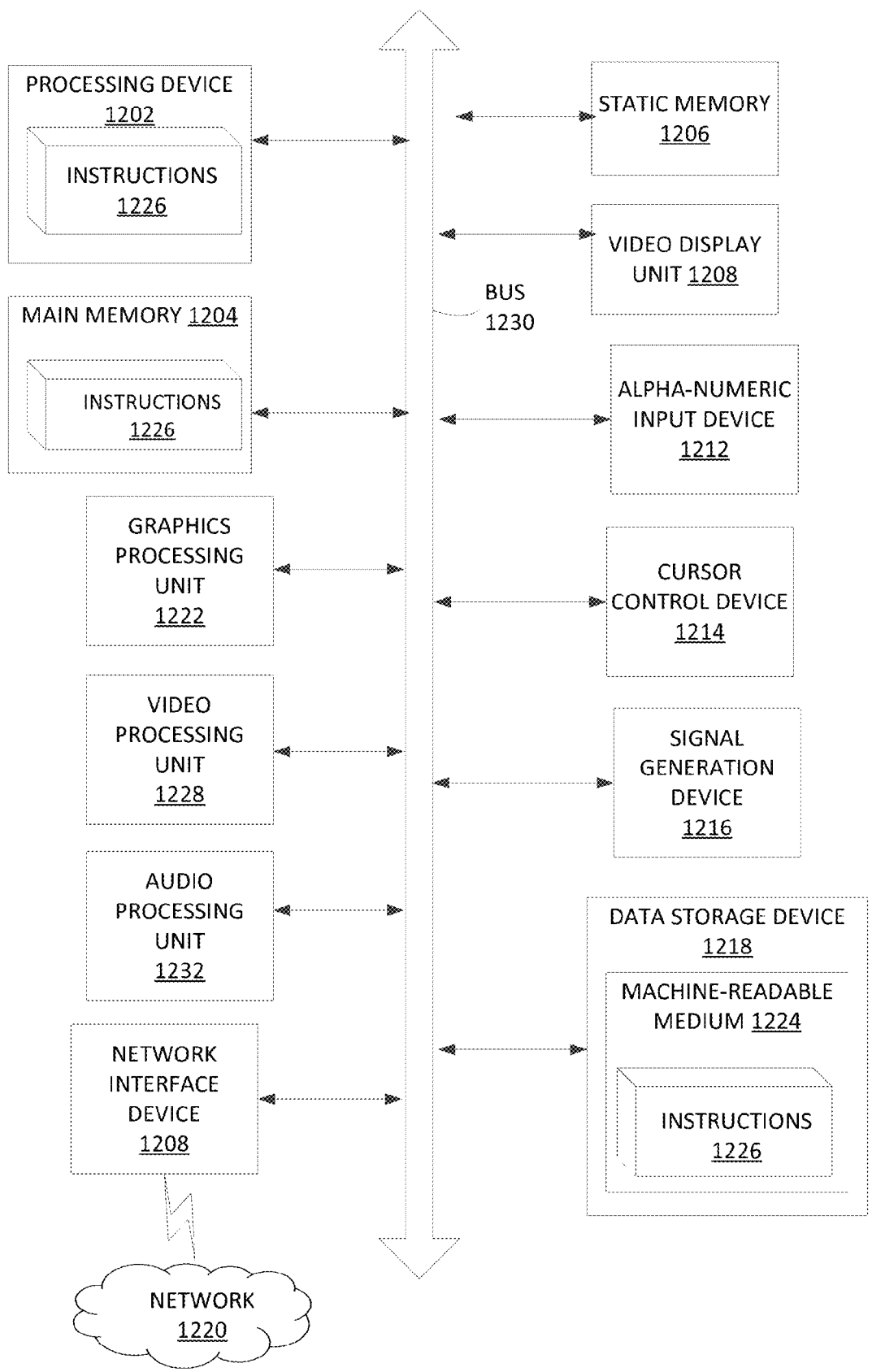
FIG. 12 illustrates another implementation of a block diagram for a computing system.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 1200 includes a processing device 1202, main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230. In some embodiments, the at-retirement checkpoint modules 107 and 200 may be implemented in the system 1200. For example, the at-retirement checkpoint modules 107 and 200 may be implemented in the processing device 1202 and/or be stored in the instructions 1226.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations discussed herein. In one embodiment, processing device 1202 can be part of the computing system 100 of FIG. 1. Alternatively, the computing system 1200 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1200 may further include a network interface device 1208 communicably coupled to a network 1220. The computing system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a signal generation device 1216 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1224 on which is stored software 1226 embodying any one or more of the methodologies of functions described herein. The software 1226 may also reside, completely or at least partially, within the main memory 1204 as instructions 1226 and/or within the processing device 1202 as processing logic 1226 during execution thereof by the computing system 1200; the main memory 1204 and the processing device 1202 also constituting computer-readable storage media.

The computer-readable storage medium 1224 may also be used to store instructions 1226 utilizing the processing device 1202, such as described with respect to FIG. 1, and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a processor comprising a memory, a memory channel coupled to the memory, and an at-retirement checkpoint module coupled to the memory through the memory channel. The at-retirement checkpoint module is operable to receive an instruction, identify if the instruction is associated with a first type of speculative error or is not associated with the first type of speculative error, and perform a first operation if the instruction is associated with the first type of speculative error. The first operation replaces a state of a first checkpoint of the processor with a state of a second checkpoint of the processor. Furthermore, the at-retirement checkpoint module is operate to update the second checkpoint based on the instruction if the instruction is not associated with the first type of speculative error.

In Example 2, the at-retirement checkpoint module of Example 1 is further operable to identify if the instruction is associated with a second type of speculative error or is not associated with the second type of speculative error and perform a second operation if the instruction is associated with the second type of speculative error. The second operation replaces the state of the first checkpoint and the state of the second checkpoint with a state of a third checkpoint.

In Example 3, in the processor of any of Examples 1-2, the at-retirement checkpoint module is further operable to identify a type of the instruction and update the state of the third checkpoint with the state of the second checkpoint based on the instruction if the instruction is not associated with the second type of speculative error and the type of the instruction is a commit instruction.

In Example 4, in the processor any of Examples 1-3, the first checkpoint is associated with state values based on a last instruction that has been allocated, the second checkpoint is associated with state values based on a last instruction that has been retired, and the third checkpoint is associated with state values based on a last commit instruction that has been retired.

In Example 5, in the processor of any of Examples 1-4, the first speculative error is a dynamic misspeculation caused by an out of order instruction pipeline of the processor and the second type of error is a static misspeculation caused by speculative code optimizations introduced by a dynamic binary translator associated with the processor.

In Example 6, in the processor of any of Examples 1-5, the first, second, and third checkpoints represent register and memory states of the processor.

In Example 7, in the processor of any of Examples 1-6, the replacing of the state of the first checkpoint of the processor with the state of the second checkpoint of the processor comprises copying a first register alias table (RAT) associated with second checkpoint to a second RAT associated with the first checkpoint.

In Example 8, in the processor of any of Examples 1-7, the first operation further flushes an instruction pipeline of the processor and at least a portion of the contents of a memory ordering buffer (MOB), and the second operation flushes the instruction pipeline of the process and at least a portion of the contents of the MOB and a speculative data cache unit (DCU) state.

In Example 9, in the processor of any of Examples 1-8, the third checkpoint is implemented by a single hardware buffer for an arbitrary number of commit instructions in-flight in a pipeline associated with the processor.

In Example 10, a method comprises receiving, by an at-retirement checkpoint module of a processor, an instruction, identifying, by the at-retirement checkpoint module, if the instruction is associated with a first type of speculative error or is not associated with the first type of speculative error, and performing, by the at-retirement checkpoint module, a first operation if the instruction is associated with the first type of speculative error. The first operation replaces a state of a first checkpoint of the processor with a state v of a second checkpoint of the processor. The method further comprises updating, by the at-retirement checkpoint module, the second checkpoint based on the instruction if the instruction is not associated with the first type of speculative error.

In Example 11, in the method of Example 10, the method further comprises identifying, by the at-retirement checkpoint module, if the instruction is associated with a second type of speculative error or is not associated with the second type of speculative error and performing, by the at-retirement checkpoint module, a second operation if the instruction is associated with the second type of speculative error. The second operation replaces the state of the first checkpoint and the state of the second checkpoint with a state of a third checkpoint.

In Example 12, in the method of any of Examples 10-11, the method further comprises identifying a type of the instruction and updating the state of the third checkpoint with the state of the second checkpoint based on the instruction if the instruction is not associated with the second type of speculative error and the type of the instruction is a commit instruction.

In Example 13, in the method of any of Examples 10-12, the first checkpoint is associated with state values based on a last instruction that has been allocated, the second checkpoint is associated with state values based on a last instruction that has been retired, and the third checkpoint is associated with state values based on a last commit instruction that has been retired.

In Example 14, in the method of any of Examples 10-13, the first speculative error is a dynamic misspeculation caused by an out of order instruction pipeline of the processor and the second type of error is a static misspeculation caused by speculative code optimizations introduced by a dynamic binary translator associated with the processor.

In Example 15, in the method of any of Examples 10-14, the first, second, and third checkpoints represent register and memory states of the processor.

In Example 16, in the method of any of Examples 10-15, the replacing of the state of the first checkpoint of the processor with the state of the second checkpoint of the processor comprises copying a first register alias table (RAT) associated with the second checkpoint to a second RAT associated with the first checkpoint.

In Example 17, in the method of any of Examples 10-16, the first operation further flushes an instruction pipeline of the processor and at least a portion of the contents of a memory ordering buffer (MOB), and the second operation flushes the instruction pipeline of the processor and at least a portion of the contents of the MOB and a speculative DCU state.

In Example 18, in the method of any of Examples 10-17, the third checkpoint is implemented by a single hardware buffer for an arbitrary number of commit instructions in-flight in a pipeline associated with the processor.

Various embodiments may have different combinations of the structural features described above. For instance, all optional features of the processors and methods described above may also be implemented with a processor described herein and specifics in the examples may be used anywhere in one or more embodiments.

Example 19 is an integrated circuit comprising a processor core and an at-retirement checkpoint module associated with the processor core and to identify an instruction in an out of order instruction pipeline of the processor core, determine if the instruction is associated with a first type of speculative error associated with the out of order instruction pipeline or is not associated with the first type of speculative error associated with the out of order instruction pipeline, and perform a nuke operation if the instruction is associated with the first type of speculative error. The nuke operation replaces a state of a first checkpoint of the processor with a state of a second checkpoint of the processor. The at-retirement checkpoint module may further update the second checkpoint based on the instruction if the instruction is not associated with the first type of speculative error.

In Example 20, in the integrated circuit of Example 19, the at-retirement checkpoint module is further to identify if the instruction is associated with a second type of speculative error or is not associated with the second type of speculative error and perform a rollback operation if the instruction is associated with the second type of speculative error. The rollback operation replaces the state of the first checkpoint and the state of the second checkpoint with a state of a third checkpoint.

In Example 21, in the integrated circuit of any of Examples 19-20, the at-retirement checkpoint module is further to identify a type of the instruction and update the state of the third checkpoint with the state of a second checkpoint based on the instruction if the instruction is not associated with the second type of speculative error and the type of the instruction is a commit instruction.

In Example 22, in the integrated circuit of any of Examples 19-21, the first checkpoint is associated with a state based on a last instruction that has been allocated, the second checkpoint is associated with a state based on a last instruction that has been retired, and the third checkpoint is associated with a state based on a last commit instruction that has been retired.

In Example 23, in the integrated circuit of any of Examples 19-22, the first speculative error is a dynamic misspeculation caused by the out of order instruction pipeline of the processor and the second type of error is a static misspeculation caused by speculative code optimizations introduced to executing code by a dynamic binary translator associated with the processor.

Various embodiments may have different combinations of the operational features described above. For instance, all optional features of the method described above may also be implemented with respect to a non-transitory computer-readable storage medium. Specifics in the examples may be used anywhere in one or more embodiments.

Example 24 is a non-transitory computer-readable storage medium including instructions that, when executed by a processor, cause the processor to perform the method of Examples 10-18.

Example 25 is a system comprising a system on a chip (SOC) that comprises a plurality of functional units and a memory controller unit (MCU) coupled to the plurality of functional units. The MCU comprises an at-retirement checkpoint module to identify an instruction in an out of order instruction pipeline of a processor core of the SOC, determine if the instruction is associated with a first type of speculative error associated with the out of order instruction pipeline or is not associated with the first type of speculative error associated with the out of order instruction pipeline, and perform a nuke operation if the instruction is associated with the first type of speculative error. The nuke operation replaces a state of a first checkpoint of the processor with a state of a second checkpoint of the processor. The at-retirement checkpoint module may further update the second checkpoint based on the instruction if the instruction is not associated with the first type of speculative error.

In Example 26, the SOC of Example 25 further comprises the subject matter of Examples 1-9.

In Example 27, in the SOC of Example 25, the at-retirement checkpoint module is further operable to perform the subject matter of Examples 10-18.

In Example 28, the SOC of Example 25 further comprises subject matter of Examples 19-23.

Example 29 is an apparatus comprising means for identifying an instruction in an out of order instruction pipeline of a processor core, means for determining if the instruction is associated with a first type of speculative error associated with the out of order instruction pipeline or is not associated with the first type of speculative error associated with the out of order instruction pipeline, and means for performing a nuke operation if the instruction is associated with the first type of speculative error. The nuke operation replaces a state of a first checkpoint of the processor with a state of a second checkpoint of the processor. The apparatus further includes means for updating the second checkpoint based on the instruction if the instruction is not associated with the first type of speculative error.

In Example 30, the apparatus of Example 29 further comprises the subject matter of any of Examples 1-9 and 20-23.

Example 31 is an apparatus comprising an at-retirement checkpoint module, where the at-retirement checkpoint module is configured to perform the method of any of Examples 10-18.

In Example 32, the apparatus of Example 31 further comprises the subject matter of any of Examples 1-9 and 19-28.

Example 33 is a non-transitory machine-readable storage medium including instructions that, when accessed by a processing device, cause the processing device to perform operations comprising receiving an instruction, identifying if the instruction is associated with a first type of speculative error or is not associated with the first type of speculative error, and performing a first operation if the instruction is associated with the first type of speculative error. The first operation is to replace a state of a first checkpoint of the processor with a state of a second checkpoint of the processor. The operations may further include updating the second checkpoint based on the instruction if the instruction is not associated with the first type of speculative error.

In Example 34, in the non-transitory machine-readable storage medium of Example 33, the operations further comprise the subject matter of any of Examples 11-18.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to cache memory data compression and decompression in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, and 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EE- PROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
    a memory;
    a memory channel coupled to the memory; and
    an at-retirement checkpoint module, coupled to the memory through the memory channel, to:
        receive an instruction;
        identify if the instruction is associated with a first type of speculative error or is not associated with the first type of speculative error;
        perform a first operation if the instruction is associated with the first type of speculative error, wherein the first operation is to replace a state of a first checkpoint of the processor with a state of a second checkpoint of the processor; and
        update the second checkpoint based on the instruction if the instruction is not associated with the first type of speculative error.

2. The processor of claim 1, wherein the at-retirement checkpoint module is further to:
    identify if the instruction is associated with a second type of speculative error or is not associated with the second type of speculative error; and
    perform a second operation if the instruction is associated with the second type of speculative error, wherein the second operation is to replace the state of the first checkpoint and the state of the second checkpoint with a state of a third checkpoint.

3. The processor of claim 2, wherein the at-retirement checkpoint module is further to:
    identify a type of the instruction; and
    update the state of the third checkpoint with the state of the second checkpoint based on the instruction if the instruction is not associated with the second type of speculative error and the type of the instruction is a commit instruction.

4. The processor of claim 3, wherein the first checkpoint is associated with state values based on a last instruction that has been allocated, the second checkpoint is associated with state values based on a last instruction that has been retired, and the third checkpoint is associated with state values based on a last commit instruction that has been retired.

5. The processor of claim 2, wherein the first speculative error is a dynamic misspeculation caused by an out of order instruction pipeline of the processor and the second type of error is a static misspeculation caused by speculative code optimizations introduced by a dynamic binary translator associated with the processor.

6. The processor of claim 2, wherein the first, second, and third checkpoints represent register and memory states of the processor.

7. The processor of claim 1, wherein the replacing of the state of the first checkpoint of the processor with the state of the second checkpoint of the processor comprises copying a first register alias table (RAT) associated with second checkpoint to a second RAT associated with the first checkpoint.

8. The processor of claim 2, wherein the first operation is further to flush an instruction pipeline of the processor and at least a portion of the contents of a memory ordering buffer (MOB), and wherein the second operation is to flush the instruction pipeline of the process and at least a portion of the contents of the MOB and at least a portion of a speculative data cache unit (DCU) state.

9. The processor of claim 2, wherein the third checkpoint is implemented by a single hardware buffer for an arbitrary number of commit instructions in-flight in a pipeline associated with the processor.

10. A method comprising:
receiving, by an at-retirement checkpoint module of a processor, an instruction;
identifying, by the at-retirement checkpoint module, if the instruction is associated with a first type of speculative error or is not associated with the first type of speculative error;
performing, by the at-retirement checkpoint module, a first operation if the instruction is associated with the first type of speculative error, wherein the first operation is to replace a state of a first checkpoint of the processor with a state of a second checkpoint of the processor; and
updating, by the at-retirement checkpoint module, the second checkpoint based on the instruction if the instruction is not associated with the first type of speculative error.

11. The method of claim 10, further comprising:
identifying, by the at-retirement checkpoint module, if the instruction is associated with a second type of speculative error or is not associated with the second type of speculative error; and
performing, by the at-retirement checkpoint module, a second operation if the instruction is associated with the second type of speculative error, wherein the second operation is to replace the state of the first checkpoint and the state of the second checkpoint with a state of a third checkpoint.

12. The method of claim 11, further comprising:
identifying a type of the instruction; and
updating the state of the third checkpoint with the state of the second checkpoint based on the instruction if the instruction is not associated with the second type of speculative error and the type of the instruction is a commit instruction.

13. The method of claim 12, wherein the first checkpoint is associated with state values based on a last instruction that has been allocated, the second checkpoint is associated with state values based on a last instruction that has been retired, and the third checkpoint is associated with state values based on a last commit instruction that has been retired.

14. The method of claim 11, wherein the first speculative error is a dynamic misspeculation caused by an out of order instruction pipeline of the processor and the second type of error is a static misspeculation caused by speculative code optimizations introduced by a dynamic binary translator associated with the processor.

15. The method of claim 11, wherein the first, second, and third checkpoints represent register and memory states of the processor.

16. The method of claim 10, wherein the replacing of the state of the first checkpoint of the processor with the state of the second checkpoint of the processor comprises copying a first register alias table (RAT) associated with the second checkpoint to a second RAT associated with the first checkpoint.

17. The method of claim 11, wherein the first operation is further to flush an instruction pipeline of the processor and at least a portion of the contents of a memory ordering buffer (MOB), and wherein the second operation is to flush the instruction pipeline of the process and at least a portion of the contents of the MOB and at least a portion of a speculative data cache unit (DCU) state.

18. The method of claim 11, wherein the third checkpoint is implemented by a single hardware buffer for an arbitrary number of commit instructions in-flight in a pipeline associated with the processor.

19. An integrated circuit comprising:
a processor core;
an at-retirement checkpoint module associated with the processor core and to:
identify an instruction in an out of order instruction pipeline of the processor core;
determine if the instruction is associated with a first type of speculative error associated with the out of order instruction pipeline or is not associated with the first type of speculative error associated with the out of order instruction pipeline;
perform a nuke operation if the instruction is associated with the first type of speculative error, wherein the nuke operation is to replace a state of a first checkpoint of the processor with a state of a second checkpoint of the processor; and
update the second checkpoint based on the instruction if the instruction is not associated with the first type of speculative error.

20. The integrated circuit of claim 19, wherein the at-retirement checkpoint module is further to:
identify if the instruction is associated with a second type of speculative error or is not associated with the second type of speculative error; and
perform a rollback operation if the instruction is associated with the second type of speculative error, wherein the rollback operation is to replace the state of the first checkpoint and the state of the second checkpoint with a state of a third checkpoint.

21. The integrated circuit of claim 20, wherein the at-retirement checkpoint module is further to:
identify a type of the instruction; and
update the state of the third checkpoint with the state of a second checkpoint based on the instruction if the instruction is not associated with the second type of speculative error and the type of the instruction is a commit instruction.

22. The integrated circuit of claim 21, wherein the first checkpoint is associated with a state based on a last instruction that has been allocated, the second checkpoint is associated with a state based on a last instruction that has been retired, and the third checkpoint is associated with a state based on a last commit instruction that has been retired.

23. The integrated circuit of claim 2, wherein the first speculative error is a dynamic misspeculation caused by the out of order instruction pipeline of the processor and the second type of error is a static misspeculation caused by speculative code optimizations introduced to executing code by a dynamic binary translator associated with the processor.

* * * * *